Figure 1:
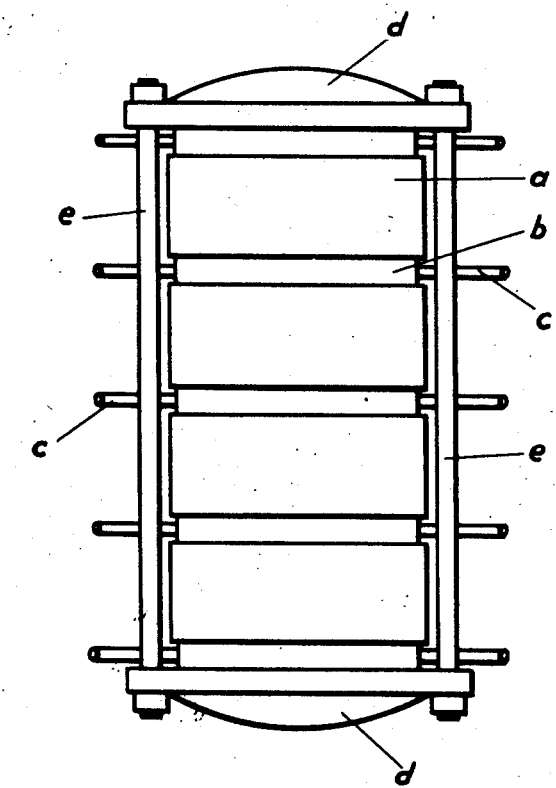

April 18, 1950 H. SPANNE 2,504,281
DEVICE FOR CONDENSERS
Filed April 4, 1947 2 Sheets-Sheet 1

Inventor
H. Spanne
By Stuart Downing Ricky
Attys.

April 18, 1950     H. SPANNE     2,504,281
DEVICE FOR CONDENSERS

Filed April 4, 1947     2 Sheets-Sheet 2

Inventor
H. Spanne

Patented Apr. 18, 1950

2,504,281

UNITED STATES PATENT OFFICE 2,504,281

DEVICE FOR CONDENSERS

Henning Spanne, Duvbo, Sweden, assignor to Telefonaktiebolaget L M Ericsson, Stockholm, Sweden, a company of Sweden Application April 4, 1947, Serial No. 739,519
In Sweden April 18, 1946

1 Claim. (Cl. 175—41)

Dielectric heat is generated in electrical condensers during operation. On said heat being transmitted from the dielectric medium to the surroundings there arise partly an inner fall of temperature in the condenser, and partly an outer fall of temperature from the condenser to the surroundings. Since the outer fall of temperature usually is an essential part of the total fall of temperature, a considerable improvement in enduring overload in the condenser is often obtained by reducing the outer fall of temperature.

In order to reduce the outer fall of temperature, cooling by means of cooling medium—gas or liquid—in forced movement is often used. Cooling with air is often managed by having a fan blow air against condensers, which have been arranged in a support. A more effective cooling is however obtained if the condensers are shaped or built together so as to form cooling chambers i. e. cavities, the walls of which at least partly consist of the walls of the condensers, which are to be cooled. Such an arrangement is nearly always used for cooling by means of liquid. The cooling chambers are often shaped as tubular cavities placed in the wall of the condenser tanks.

Especially on cooling by means of liquid, but also to a certain degree on cooling by means of air there often arise the drawback, that the walls of the cooling chamber are attacked and damaged by the cooling medium. Thus, rust is formed on using water when the walls of the condenser tanks consist of iron sheet, which is usually the case.

Another drawback, which can arise on cooling with gas or liquid in forced movement, is a deposit of dust or sludge resp. in the cooling chambers. Deposits of such material can sensibly impair the heat emission from the walls of the condenser tanks to the cooling medium, risks for damage of the condensers thereby arising. In serious cases, the cooling chambers can be so obstructed, that the movement of the cooling medium is prevented, the temperature of the condenser and the risk for damage thereby further increasing.

The present invention relates to a device for condensers cooled by means of gas or liquid in forced movement, wherein the above mentioned drawbacks are avoided or reduced. The aim of the invention is to produce cooling chambers formed as closed tanks, the walls of which are brought into contact with the walls of the condensers, which are to be cooled, a possibility thereby being obtained, of making the cooling chambers out of another material than the condenser tanks. Whilst it is most often necessary to make the walls of the condenser tanks of iron, the cooling chambers may suitably be made of a material, which is more resistant to rust, e. g. copper. If the cooling chambers are made easy to change, they can be cleaned without any discontinuancy of running taking place, if only a sufficient number of cooling chambers are kept in store for the change.

The invention will be described more clearly with reference to the accompanying drawings. Fig. 1 shows how a number of condensers have been combined with a number of cooling chambers, and Figs. 2, 3 and 4 different embodiments of the cooling chamber.

In the device according to Fig. 1, there are four condensers $a$, shaped as flat cylinders piled on top of each other. Cooling chambers $b$ are placed between the condensers and outside the farthest one. The cooling chambers are also shaped as flat cylinders having a diameter nearly equal to the diameter of the condensers and a hight of about a third of the hight of the condensers. Together with the condensers they form a pile stretched between two end pieces $d$ with screws $e$. In the shown example, the cooling chambers are intended for cooling by means of cooling liquid, which is brought and removed through tubes $c$. By loosening the nuts of the screws any one of the cooling chambers can be changed without any or with a very short discontinuancy in the running of the condensers.

Figure 2:
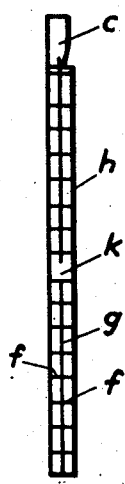
Figure 3:
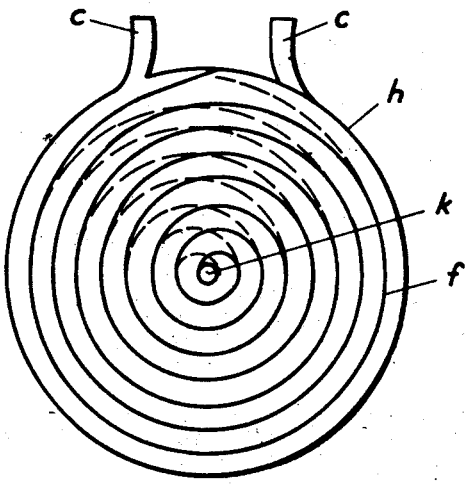

The cooling chamber according to the Figs. 2 and 3, where Fig. 2 shows the cooling chamber in cross section seen from the edge, and Fig. 3 shows the same cooling chamber in cross section seen from one of the end surfaces, is intended for cooling by means of liquid. It consists of a tank $h$ shaped as a flat cylinder, in which there is a central iron sheet $g$. Narrow bands $f$ of metal, shaped each as a spiral, are welded by spot welding on each side of said iron sheet. The width of the band is exactly fitted so that the central sheet with adjusted bands fits the tank with said bands tightening against the walls of the tank. The spirals are equal, one of them being turned in respect to the other, a hole $k$ furthermore existing in the middle of the central iron sheet. After the central iron sheet with spirals having been placed in the tank $b$, a continuous channel is formed from the farthest layer of one of the spirals to the center, through the hole $k$ to the center of the spiral-shaped channel on the other side of the central iron sheet, the channel continuing from there on to the farthest layer. Excavations $c$ for supplying and removing the cooling liquid are arranged at the farthest layer of both channels. By means of said device the cooling liquid sweeps the two end surfaces of the cooling chamber equally. As well the tank $h$ as the central iron sheet and the spirals are made out of rust resistant material, e. g. of copper, as in the described embodiment.

Figure 4:
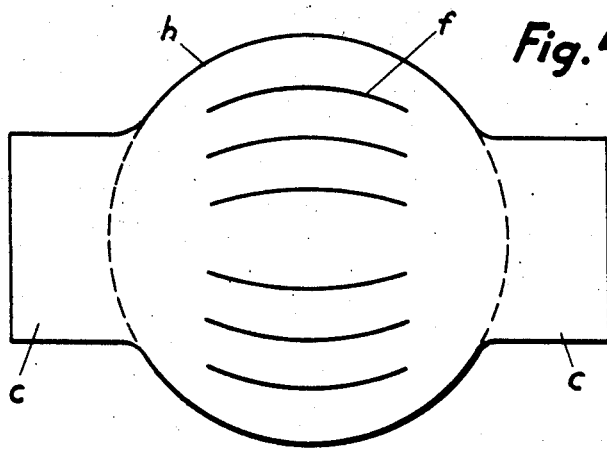

A cooling chamber for cooling by means of a gaseous medium, e. g. air, is shown in Fig. 4. The cooling chamber is seen in cross-section from the end surface. The cooling medium is supplied and removed through the excavations $c$. Bands $f$ are arranged in said excavations as steering flanges, which steer the cooling medium so, that it sweeps the two bottom surfaces of the cooling chamber as equally as possible.

I claim:

In a condenser, a plurality of condenser elements, a plurality of cooling elements arranged alternately one upon the other to form a pile, all of said elements constituting complete units and each capable of removal independently of the other units, each of the cooling elements being in the form of a flat cylindrical tank the outer surfaces of the walls of which are in contact with the walls of the condenser elements, a central circular sheet dividing each cylindrical tank into two compartments and provided with a central aperture, narrow bands of metal shaped as spirals fixed to the opposite surfaces of the central sheet and to the adjacent walls of each of the tanks and extending in opposite directions and forming a continuous channel extending from the outer portion of each tank inwardly and through the central opening and thence outwardly, and means for teachably securing the several elements in heat exchanging relation.

HENNING SPANNE.

REFERENCES CITED

The following references are of record in the file of this patent:

UNITED STATES PATENTS

| Number | Name | Date |
|---|---|---|
| 1,816,641 | Dubilier | July 28, 1931 |
| 2,098,746 | Hansson | Nov. 9, 1937 |

FOREIGN PATENTS

| Number | Country | Date |
|---|---|---|
| 335,829 | Great Britain | Oct. 2, 1930 |